United States Patent Office
3,686,164
Patented Aug. 22, 1972

3,686,164
SULFURIC ACID MONOESTERS OF TRAGACANTH AND PROCESS FOR THE PREPARATION THEREOF
Richard Unger, Georg Seitz, Michael Klockow, and Werner Mehrhof, Darmstadt, Germany, assignors to Merck Patent Gesellschaft mit beschrankter Haftung, Darmstadt, Germany
No Drawing. Filed Apr. 20, 1970, Ser. No. 30,221
Claims priority, application Germany, Apr. 22, 1969,
P 19 20 350.0
Int. Cl. C07c 69/32
U.S. Cl. 260—234  5 Claims

ABSTRACT OF THE DISCLOSURE

The sulfuric acid monoesters of tragacanth and their salts have a pepsin-inhibitory effect useful in the treatment of stomach ulcer and gastritis.

BACKGROUND OF THE INVENTION

This invention relates to novel esters of tragacanth.
Tragacanth (tragacantha) is the name for the hardened gum exuded by the stem elements of various plant types of Asia Minor. A preferred tragacanth is obtained from Astragalus types, for example from *Astragalus gummifer, Astragalus verus,* or *Astragalus microcephalus.* Tragacanth can also be obtained from various Sterculia species, e.g., *Sterculia urens,* or from *Cochlospermum gossypium.* Tragacanth consists of a mixture of water-insoluble polysaccharides (bassorin; molecular weight 10,000) and water-soluble polysaccharides (tragacanthin; molecular weight 100,000), which yield on hydrolysis L-arabinose, L-fucose, D-xylose, D-galactose, and D-galacturonic acid. Because tragacanth is a mixture of polysaccharides, it is difficult to characterize by the usual physical criteria. The viscosity of the gel obtained from 1 g. of tragacanth with 2 ml. of ethanol and 100 ml. of water is at least 22 and, on the average, 40–80, centipoises. Its viscosity is also a yardstick of its age, since tragacanth after storage produces gels having a viscosity which is lower than fresh tragacanth.

SUMMARY OF THE INVENTION

According to this invention, sulfuric acid monoesters of tragacanth and the physiologically acceptable salts thereof are prepared by treating tragacanth with a sulfating agent. The thus-produced tragacanth sulfuric acid monoester can thereafter be converted into physiologically acceptable salts thereof.

The sulfuric acid monoesters of tragacanth of this invention possess a strong pepsin-inhibitory effect and can thus be employed for treatment of stomach ulcer and gastritis. For example, the sodium salt of tragacanth acid sulfate shows, depending on the pH value, an inhibition of the proteolytic reaction of pepsin with a 1% hemoglobin solution up to 35% greater than that of a known comparison preparation consisting of sulfated amylopectin. Tragacanth itself is completely ineffective in this experimental procedure.

DETAILED DISCUSSION

In selecting the tragacanth to be sulfated, an especially suitable tragacanth is one which satisfies the requirements of United States Pharmacopeia (U.S.P. XVII) or the "Deutsches Arzneibuch" [German Drug Book] (DAB 6 or DAB 7).

The novel compounds can be prepared by treating tragacanth with a sulfating agent under conditions wherein there are substantially no other undesired changes in the substrate, e.g., hydrolysis of polysaccharide bonds.

Suitable sulfating agents are those which sulfate hydroxy groups in a conventional manner. The degree of sulfation can be controlled by the selection of suitable reaction conditions, the type of sulfating agent being especially important. Suitable sulfating agents include sulfuric acid, chlorosulfonic acid and the alkali metal salts thereof, sulfamic acid, sulfuryl chloride, gaseous $SO_3$, a mixture of $NaNO_2$ and $NaHSO_3$, complexes of $SO_3$ with organic bases, e.g., $SO_3$-trimethylamine, $SO_3$-triethylamine, $SO_3$-pyridine, $SO_3$-collidine, $SO_3$-dimethylaniline or with ethers, e.g., $SO_3$-dioxane or $SO_3$-bis-(2-chloroethyl) ether.

A preferred sulfating agent is chlorosulfonic acid in a tertiary organic base, especially pyridine, or in a neutral solvent, such as, for example, an amide, including formamide, acetamide, dimethylformamide, and dimethyl acetamide. With this sulfating agent, sulfation takes place at temperatures of between −10 and 100° C., e.g., in pyridine, preferably between 60 and 80, especially about 70° C.; in formamide, preferably between −10 and 50° C., especially at room temperature. Under these conditions sulfation is usually conducted for about ½ to 48 hours, e.g., approximately 1–3 hours at 70° C.

Particularly suitable sulfating agents are the complexes of $SO_3$ with amines, such as the $SO_3$-trimethylamine complex, with which the sulfation can be conducted in water in the presence of an alkali at reaction temperatures of between 0 and 100° C. The reaction period is dependent on the reaction temperature and can vary from 2 to 100 hours.

In conducting the sulfation, the tragacanth can be added in powdered form to the sulfating agent or to a solution of the sulfating agent. It is also possible to add the sulfating agent or the solution thereof to the tragacanth or to a mixture of tragacanth and solvent.

The tragacanth acid sulfates of this invention are usually isolated in the form of the physiologically acceptable salts thereof. Those salts include the ammonium salts thereof, e.g., the salts thereof with ammonia, mono-, di- or triethanol-amine; the alkali-metal salts thereof, e.g., the sodium, potassium, and lithium salts; and the alkaline earth metal salts thereof, e.g., the calcium or magnesium salts. Others are, e.g., the optionally basic aluminum and bismuth salts. When the sulfating agent is a salt, for example, an alkali metal chlorosulfonate; when a salt is formed with the sulfating agent prior to the sulfation, for example, an $NaNO_2$—$NaHSO_3$— mixture; or when the reaction mixture contains a base, for example, NaOH, which can react with the acidic sulfuric acid ester group of the final product, such salts are formed directly in the reaction mixture. They can also be produced by neutralizing the free tragacanth acid sulfate if the latter is primarily produced during the sulfation process. Suitably, an excess of the base is employed which provides a final pH of about 12–14. The desired salt can also be obtained by conducting an exchange reaction between a salt produced by means of one of the above-mentioned methods and a reactant containing cations of the desired salt. The salts of the tragacanth acid sulfate, especially the sodium salts, exhibit an increased stability, rapid water solubility, and a high potency as pepsin-inhibitory and anti-ulcerogenic agents.

For purposes of isolating and purifying the reaction products, it is possible to employ, separately or in combination, methods such as filtration, decanting, centrifuging, precipitation or extracting with organic solvents, dialysis, lyophilization, spray drying, and drum drying. For precipitation, the reaction mixture is first mixed with water, and acetone or, preferably, an alcohol of 1–4 carbon atoms, e.g., methanol, ethanol, or isopropanol, is added thereto. This precipitation can be repeated one or more times, while at the same time, if desired, altering the pH.

The products of the process are normally amorphous powders having a white, yellowish, or brownish color, depending on their purity. Since they are mixtures of sulfated polysaccharides, they do not have a constant chemical constitution. For purposes of characterization, the determination of their sulfur content is especially suitable, which content is also a measure of the degree of sulfation. The sulfur content of the products of this invention ranges between about 10 and 20%, and, of the preferred products, between about 12 and 19% by weight, depending on the size of the cation in the respective acidic ester or ester salt.

Of the products of this invention, the sodium salts are particularly preferred. These sodium salts have a sulfur content of about 13–18%, preferably about 14–16.5% by weight. At lower sulfur contents, the antipepsin effect decreases. In the sodium salts, the molar ratio of Na to S is preferably about 1:1, so that the sodium content of these salts is about 9.5 to 13.5%, preferably about 10–12.5%, by weight.

The sodium salts are further characterized by the low viscosities of the colloidal aqueous solutions thereof. These viscosities are lower than those of the tragacanth employed as the starting material by about a factor of ten, i.e., normally, about 2–5 centipoises in a 1% aqueous solution at 20° C.

The novel compounds can be employed as a mixture with solid, liquid, and/or semi-liquid excipients conventional in the human or veterinary medicine. Suitable pharmacologically acceptable carriers are those organic or inorganic substances amenable to enteral application and which do not react with the novel compounds, such as, for example, water, polyethylene glycols, gelatine, lactose, amylose, magnesium stearate, or talc. Suitable for this mode of administration are tablets, dragees, powders, syrups, or juices. The above-mentioned preparations can optionally be sterilized or mixed with auxiliary substances, such as preservatives, stabilizers, or wetting agents, or salts for influencing the osmotic pressure, buffer substances (e.g. aluminum glycinate), coloring, flavoring and/or aromatous agents. The compounds of this invention can also be used in combination with agents conventionally used in ulcer therapy, e.g., antacids and/or anticholinergic agents.

Illustrative anticholinergic agents are aminopentamide acid sulfate, atropine sulfate, glycopyrronium bromide, mepiperphenidol, methantheline bromide, penthienate bromide and propantheline bromide. They are prepared in oral dosage forms, e.g. tablets, according to standard procedures known to the art-skilled. The anticholinergic agent is administered in a daily dose consonant with oral administration. Such dose is known to the art-skilled and is otherwise available from, e.g., the package insert or the "Physicians' Desk Reference."

The compounds of this invention, in oral application, are preferably administered orally in dosages of 0.1 to 5 g. per dosage, one or more times per hour or day.

The daily dose of the selected tragacanth sulfuric acid monoester is ordinarily divided into from 2 to 6 equal dosages administered at intervals during the day, e.g., two equal doses, one taken prior to breakfast and the other immediately before retiring. An exemplary formulation is set forth below.

In the following examples, the temperatures are set forth in degrees centigrade.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsover.

Example 1

Within 2 hours, 120 g. of chlorosulfonic acid is added dropwise to 800 g. of pyridine at 10–20°. Thereafter, the mixture is heated to 70° and, under stirring, 40 g. of tragacanth (U.S.P XVII quality) is added. The reaction mixture is then agitated for 2 hours at 70°, allowed to settle, decanted, and the residue is mixed with 800 ml. of water. Hydrochloric acid is added until a pH of 1 to 2 is reached. Under strong agitation, 1,600 g. of isopropanol is added, and the reaction mixture is stirred for 30 minutes, again allowed to settle, and decanted. The thus-obtained free sulfuric acid monoester of tragacanth is again taken up in 800 ml. of water and then brought to a pH of 8.5 with solution of sodium hydroxide. Then, 1,600 g. of isopropanol are added once again, the reaction mixture is stirred for 10 minutes, decanted, taken up in 400 ml. of water, and the solution is filled into a dialysis tube. Dialysis is conducted first against tap water and then fully deionized water until the pH is 6.6–6.8. After evaporation under reduced pressure, sodium tragacanth sulfate is obtained as a slightly brownish powder having, after drying for 4 hours at 105°, a sulfur content of 15.5% and a sodium content of 11.3%. It forms a colloidal solution with water.

A low resolution infrared spectrum (in KBr) shows bands having maxima at 3390, 1630, approximately 1240, approximately 1100, and approximately 810 cm.$^{-1}$.

One gram of the thus-obtained product is triturated in a mortar with 2 ml. of ethanol and then stirred thoroughly twice with 10 ml. portions of water. After 15 minutes, an additional 30 ml. of water and, after another hour, another 50 ml. of water, are added to the reaction mixture. After a further 15 minutes, the thus-obtained viscid solution exhibits a viscosity of 3.9 centipoises (at 20°), measured with a Höppler viscometer.

The colloidal aqueous solution of the sodium tragacanth sulfate yields, with a few drops of 0.1 N iodine solution, a black-green coloration. After allowing the the reaction solution to stand for 15 hours, a black precipitate separates therefrom. Shaking an aqueous solution of the sodium tragacanth sulfate with 15% ethanolic 1-naphthol solution and adding twice the amount of sulfuric acid results in a deep purple color. Sodium tragacanth sulfate does not yield any color reactions with Fehling's solution, $FeCl_3$-solution, or Schiff's reagent.

Approximately 0.1 g. of sodium tragacanth sulfate is moistened with 3 drops of ethanol and then dissolved in 20 ml. of water, and 0.5 ml. of 3% $H_2O_2$ and thereafter 0.5 ml. of 1% ethanolic benzidine solution are added thereto and the reaction mixture is vigorously shaken. A weak blue-green coloration occurs after 15 minutes, which coloration becomes somewhat stronger if the mixture is allowed to stand for several hours.

In accordance with the above-described process, bringing the sulfuric acid monoester of tragacanth to a pH of 8.5 with aqueous ammonia rather than sodium hydroxide, ammonium tragacanth sulfate is obtained.

Example 2

10 g. of tragacanth are stirred together with 450 ml. of water containing 21 g. of sodium hydroxide, so that a slime is obtained. To this reaction mixture is then added, with vigorous stirring and mixing, 40 g. of $SO_3$-trimethylamine complex. The reaction mixture is thereafter stirred overnight at room temperature and then for 2 hours at 60°, evaporated to 150 ml. under reduced pressure to remove the trimethylamine and cooled. The mixture, which has a pH of 11–12, is dialyzed against running water until the pH is 7. After spray drying, sodium tragacanth sulfate is obtained having a sulfur content of 14%.

By replacing the sodium hydroxide in the above method by 29 g. of potassium hydroxide, the potassium salt of tragacanth sulfate is obtained.

Example 3

(a) 100 g. of tragacanth is reacted in 1,900 g. of pyridine with 300 g. of chlorosulfonic acid in the manner described in Example 1. After the reaction is complete, the product is vacuum-filtered. The filter cake is stirred together with 1,000 g. of methanol, again vacuum-filtered, and washed with methanol until the filtrate no longer contains any chlorine or sulfate ions. Thereafter, the filter cake is stirred with 150 ml. of water, and an aqueous solution of sodium hydroxide is added until a pH of 12–14 is reached. To the resulting mixture, 6 liters of methanol are added under stirring, and the thus-precipitated sodium salt is vacuum-filtered. The reaction product is washed free of pyridine and neutralized with methanol and then dried. The product contains 15.1% sulfur and 10.9% sodium by weight.

(b) A solution of 10 g. of the thus-obtained sodium salt in 50 ml. of water is mixed with 10% $BaCl_2$ solution until the precipitation is ended. The thus-produced barium tragacanth sulfate is filtered off, washed with water and methanol, and dried.

Example 4

Under agitation and with cooling, 2.4 kg. of chlorosulfonic acid is added dropwise to 8 kg. of formamide at 10–20°. Cooling is discontinued and 800 g. of dry tragacanth is introduced batch-wise. The reaction mixture is stirred overnight at room temperature. The next morning, 16 liters of methanol are stirred into the mixture, and the latter is further agitated until it is homogeneous. The reaction mixture is then vacuum-filtered, washed with methanol, and the residue is dissolved in 12–14 liters of water. The resulting mixture is agitated until homogeneous, and a solution of sodium hydroxide is added thereto until a pH of 12–14 is reached. After allowing the mixture to stand for 3 hours, the solution is dialyzed against water until a pH of 6–7 is attained, and the thus-obtained solution is evaporated by spray drying. Sodium tragacanth sulfate is obtained containing 14.8% of sulfur and 11.0% of sodium.

Example 5

With stirring and cooling, 600 g. of chlorosulfonic acid is added dropwise to 3,800 g. of pyridine at an internal temperature of 20–30°. Thereafter, the reaction mixture is heated to 70°, 200 g. of tragacanth is added batch-wise, and the mixture is stirred for another 2 hours at 70°. The mixture is allowed to cool and then vacuum-filtered. The residue is treated with 1 liter of methanol with stirring and once again vacuum-filtered and washed with 500 ml. of methanol. The thus-obtained crude mixture of sulfuric acid monoesters of tragacanth is stirred into 3 liters of water until the mixture is homogeneous, mixed with a solution of sodium hydroxide until a pH of 13–14 is reached, and dialyzed against water up to a pH of 6–7. By evaporation, sodium tragacanth sulfate is obtained containing 15.6% of sulfur and 11.3% of sodium.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

The following examples include pharmaceutical compositions of the novel compounds:

Example 6.—Tablets

Each tablet contains:

| | G. |
|---|---|
| Sodium salt of tragacanth sulfuric acid monoester | 0.1 |
| Lactose | 0.22 |
| Magnesium stearate | 0.05 |
| $Al(OH)_3$ | 0.03 |

Example 7.—Tablets

| | |
|---|---|
| Sodium salt of tragacanth sulfuric acid monoester | 0.6 |
| Lactose | 0.29 |
| Magnesium stearate | 0.03 |
| $Al(OH)_3$ | 0.05 |
| Talc | 0.03 |

Example 8.—Dragees

| | |
|---|---|
| Sodium salt of tragacanth sulfuric acid monoester | 0.4 |
| Amylose | 0.15 |
| Lactose | 0.1 |
| Magnesium stearate | 0.03 |

The coating (0.2 g.) is a conventional mixture of corn starch, sugar, talc and tragacanth.

Example 9.—Syrup

A mixture of:

| | Kg. |
|---|---|
| Sodium salt of tragacanth sulfuric acid monoester | 8.0 |
| Glycerol (twice distilled) | 12.5 |
| Cane sugar | 51.0 |
| Methyl p-hydroxybenzoate | 0.7 |
| Fruit flavorings | As desired | is dissolved in distilled water in such a manner that the volume of the entire preparation is 100 l. A dosage unit (5 ml.) contains 0.4 g. of active substance.

Example 10.—Syrup

A mixture of:

| | Kg. |
|---|---|
| Sodium salt of tragacanth sulfuric acid monoester | 2.0 |
| Glycerol (twice distilled) | 7.5 |
| Cane sugar | 56.0 |
| Methyl p-hydroxybenzoate | 0.07 |
| n-Propyl-p-hydroxybenzoate | 0.03 |
| Ethanol | 10.0 |
| Fruit flavorings | As desired | is dissolved in distilled water in such a manner that the volume of the entire preparation is 100 l. A dosage unit (5 ml.) contains 0.1 g. of active substance.

Instead of the sodium salt of tragacanth sulfuric acid monoester, other physiologically compatible salts of tragacanth sulfuric acid monoester or the free compound as well as their physiologically compatible salts can be incorporated into similar compositions.

What is claimed is:

1. Tragacanth sulfuric acid monoester and the physiologically acceptable ammonium and metal salts thereof.

2. A compound of claim 1 having a sulfur content of about 12–19% by weight.

3. The sodium salt of the tragacanth sulfuric acid monoester of claim 1.

4. The sodium salts of claim 3 having a sulfur content of about 13–18% and a sodium content of about 9.5–13.5% by weight.

5. The sodium salts of claim 4 having a sulfur content of about 14 to 16.5% and a sodium content of about 10 to 12.5%.

References Cited

UNITED STATES PATENTS

| 1,665,580 | 4/1928 | Davis | 260—234 R |
| 1,861,209 | 5/1932 | Davis | 260—234 R |
| 2,523,708 | 9/1950 | Moe | 260—234 R |

LEWIS GOTTS, Primary Examiner

J. R. BROWN, Assistant Examiner

U.S. Cl. X.R.

424—180